May 21, 1929.  S. RUBEN  1,714,319
ELECTROSTATIC CONDENSER
Filed Aug. 22, 1927
Fig. 1,
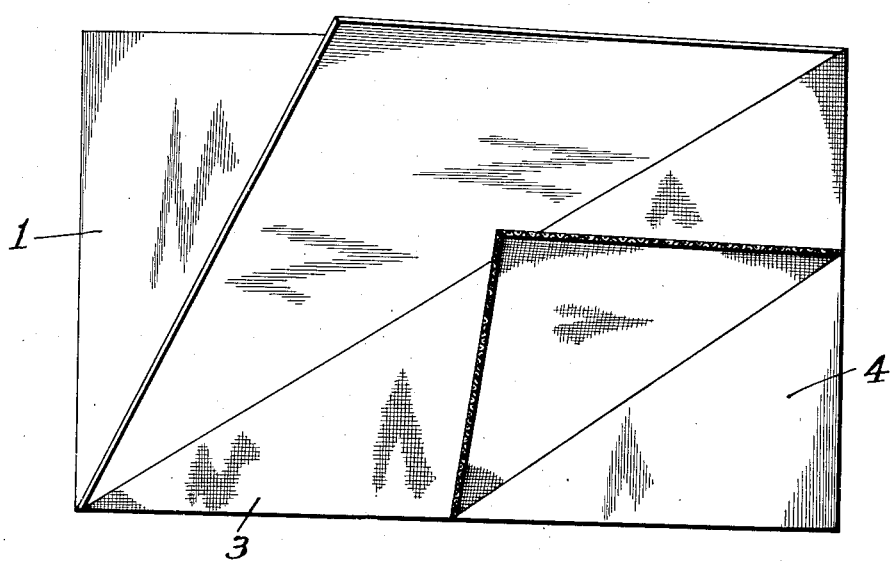
Fig. 2,
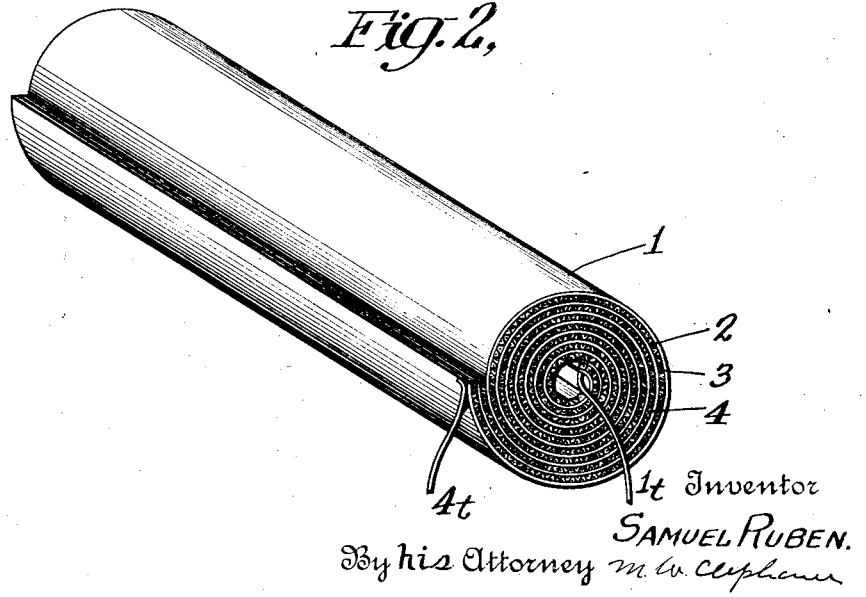
Inventor
SAMUEL RUBEN.
By his Attorney Patented May 21, 1929.

1,714,319

UNITED STATES PATENT OFFICE.

SAMUEL RUBEN, OF NEW YORK, N. Y.

ELECTROSTATIC CONDENSER. REISSUED

Application filed August 22, 1927. Serial No. 214,777.

This invention relates to electro-static condensers; its object is to provide a high capacity condenser of high efficiency. Another object is to provide a condenser having high capacitance when used in alternating current circuits.

The condenser of my invention depends for operation upon an electrolytically formed current-blocking layer. In the prior art there are electrolytically formed condensers of two types, the gas layer polarized cell type and the electrolytically formed film layer type. The polarized cell type operates below the decomposition potential of the solution by employing the polarized effect of a gas layer at its electrode surface; the latter type, as exemplified by those using aluminum electrodes, employs a current-blocking film of a composite gas layer and hydroxide or oxide film; they use a film-forming compound either in the form of a solution or a paste mixture, the ohmic resistance of the electrolyte being relatively high. For uses on power filter circuits where efficiency and high capacitances are desirable, both of these devices have undesirable limitations. The condenser of my invention has the equivalent of a metallic conductive path, that is, by the finely divided conductive metal particles, such as copper, which are in such close contact as to give a low internal resistance. It is of the film-forming type having a specific kind of electrolyte, which is a film-forming composition, the electrodes being separated by a porous retiform spacer. The combination gives a condenser of large electro-static capacity and high efficiency.

I have found that copper powder mixed with a saturated solution of potassium fluoride contacting with the electrodes forms a film which is a current-blocking layer when connected as the anode in a circuit, and that an efficient condenser is made up of copper plate electrodes having therebetween a thin layer of such a mixture. A current-blocking coating is quickly formed about the surface of the copper particles with the discharge of current, thus giving a wide contact resistance area at the electrode surfaces. To maintain a uniform salt conductivity a slight amount of glycerin or other hygroscopic material may be added. To insure the continued even distribution of the electrolyte, this element is preferably spread over the surface of a suitable porous or reticular spacer, such as a cotton gauze material preferably dipped in paraffin.

As the electrolyte used enables the quick reformation of current-blocking coatings after its penetration by an excessive discharge, the device is self-healing and in addition to being adapted as a condenser, is also well adapted for use as a lightning arrester.

Reference is made to the accompanying drawings showing one embodiment of the invention, in which Fig. 1 shows a flat plate form of condenser and Fig. 2 a condenser having its elements in coil form. In Fig. 1, 1 and 4 represent copper plate electrodes and 3 a cloth spacer which is impregnated with an electrolyte containing finely divided copper powder. On the adjacent surfaces of the electrodes an electrolytically formed film covers the areas contacting with the electrolyte. In Fig. 2 those elements are represented by corresponding figures, 2 showing the electrolyte applied to the spacer between the electrodes.

The condenser has been described as employing copper electrodes with a film-forming electrolyte containing copper particles. However, other metals, such as aluminum, magnesium, silver and tantalum, are also applicable with small particles of metal mixed with a suitable separating film-forming electrolyte.

What I claim is:

1. An electrical condenser comprising copper plate electrodes having in surface contact therebetween a mixture of small particles of copper in a solution of potassium fluoride.

2. An electrical condenser comprising copper plate electrodes having in surface contact therebetween copper particles and an electrolyte of potassium fluoride held under suspension by a spacer in reticular form.

3. An electrical condenser comprising copper plate electrodes having in surface contact therebetween a mixture composed of copper particles with a film-forming electrolyte.

4. An electrical condenser comprising copper plate electrodes having in surface contact therebetween a mixture composed of copper particles and a film-forming electrolyte of a fluoride.

5. An electrical condenser comprising copper plate electrodes having in surface contact therebetween a mixture composed of copper particles and a film-forming electrolyte of a fluoride held in suspension by a reticular body.

6. An electrical condenser comprising metal plate electrodes having in surface contact therebetween a mixture of fine particles of the same metal and a film-forming electrolyte of a fluoride.

In testimony whereof, SAMUEL RUBEN has signed his name to this specification, this 21st day of July, 1927.

SAMUEL RUBEN.